(No Model.)

L. KEEN.
TIRE GAGE FOR LOCOMOTIVES.

No. 366,401. Patented July 12, 1887.

WITNESSES:
John A. Ellis
C. Sedgwick

INVENTOR:
L. Keen
BY Munn & Co
ATTORNEYS.

UNITED STATES PATENT OFFICE.

LEWIS KEEN, OF NORTH McGREGOR, IOWA.

TIRE-GAGE FOR LOCOMOTIVES.

SPECIFICATION forming part of Letters Patent No. 366,401, dated July 12, 1887.

Application filed April 20, 1887. Serial No. 235,473. (No model.)

*To all whom it may concern:*

Be it known that I, LEWIS KEEN, of North McGregor, in the county of Clayton and State of Iowa, have invented a new and Improved Tire-Gage for Locomotives, &c., of which the following is a full, clear, and exact description.

This invention, while applicable to measuring worn surfaces of various kinds, is mainly designed for measuring the worn tires of locomotive-engines, and will here be described accordingly. The invention consists of a profile-gage of novel construction, substantially as hereinafter described, and pointed out in the claims.

Reference is to be had to the accompanying drawings, forming a part of this specification, in which similar letters of reference indicate corresponding parts in all the figures.

Figure 1:
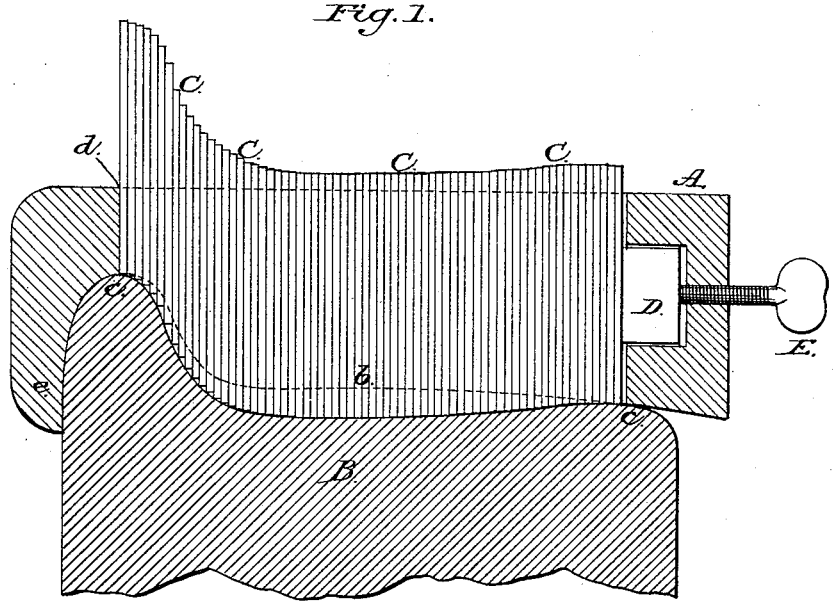
Figure 2:
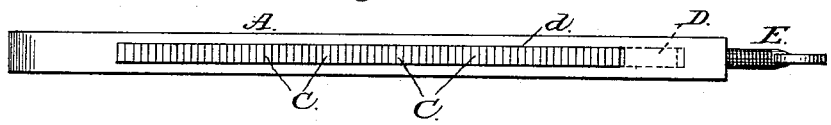
Figure 3:
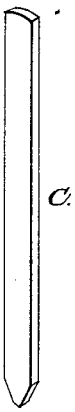

Figure 1 represents a longitudinal section of the gage in direction of its depth, as applied to a worn locomotive-wheel tire, shown only in part; Fig. 2, a top or outer longitudinal edge view of the gage, and Fig. 3 a perspective view of one of the adjustable wards or measuring-strips of the gage.

A is the gage-stock or ward-holder of the gage, of somewhat greater length than the width of the worn tire, B, to be measured, and constructed to hug the flange of the tire, as at $e$. This stock or holder is shaped on its inner or lower marginal surface to conform to the original profile of the tire, or, in other words, to the shape of the tire as it should be and before the same has been worn by its run on the rail, as shown at $b$, and is further shaped on said surface to rest upon the flange and inner portion of the tread of the tire, as at $c\ c$. Its upper or outer longitudinal margin may be straight.

Fitting freely down within and through a longitudinal slot, $d$, in said stock in direction of its depth are a series of adjustable wards or measuring-strips, C C, of equal length and somewhat longer than the depth of the stock. These wards, which may be beveled off at their inner ends, are straight or flat throughout their length, and when in place in the stock lie close up one against the other, but are separately adjustable in direction of their length.

To measure the worn tire B, the stock or ward-holder A is placed on or across the tire at different points of the circumference thereof, as desired, and so that it rests upon the tire at $c\ c$, as described. The wards or measuring-strips C C are then forced down or inward by hand till they each come in contact at their inner ends with the tire, as shown in Fig. 1, after which they are clamped or held to their adjustment by a sliding block, D, in the stock actuated by a thumb or other screw, E. The gage, having been thus set and applied, will show by the contour of the line or profile which both the inner and outer ends of the wards C C assume the actual shape and wear of the worn tire B, and by the contour of the inner longitudinal margin, $b$, of the stock the precise measurement may be taken of the amount of wear at different points, the projection of the inner end portions of the wards C C below or beyond the margin $b$ indicating and providing for this, inasmuch as the contour of the margin $b$ conforms to the original or proper profile of the tire.

I am aware that profile-gages for moldings have been made in which a rectangular holder has been fitted with separately-adjustable rods through it, acting in concert with a yielding pressure-surface and held in place, when adjusted, by a clamp. Such, therefore, I do not claim.

Having thus described my invention, what I claim as new, and desire to secure by Letters Patent, is—

1. A locomotive-tire or other gage for indicating and measuring worn surfaces, consisting of a longitudinally-slotted stock or ward-holder having a marginal contour along its one edge or face corresponding to the original or proper shape of the surface being measured, a series of separately-adjustable wards or measuring-strips passing through the slot in the holder, and a clamp for holding said wards in position when adjusted to the worn surface being measured, substantially as specified.

2. In a gage for measuring worn locomotive-wheel tires, the combination of the stock or ward-holder A, having a longitudinal slot, d, flange-hugging portion e, and of a marginal contour on its inner face or surface, b, corresponding to the original profile of the tire, the separately-adjustable wards or measuring-strips C C, of equal length, arranged to pass through the slotted portion of the holder, and the sliding block D, with its actuating and clamping screw E, essentially as shown and described.

LEWIS KEEN.

Witnesses:
CHARLES J. OEHNING,
GEORGE BARRETTE.